United States Patent [19]

Matsunaga

[11] Patent Number: 5,251,124
[45] Date of Patent: Oct. 5, 1993

[54] FUZZY CONTROLLER APPARATUS AND METHOD FOR STEADY STATE CONTROL

[75] Inventor: Nobutomo Matsunaga, Hirakata, Japan

[73] Assignee: Omron Corporation, Kyoto, Japan

[21] Appl. No.: 693,635

[22] Filed: Apr. 30, 1991

[51] Int. Cl.⁵ .............................................. G05B 13/00
[52] U.S. Cl. .................................... 364/176; 364/161; 364/165; 364/177; 395/900
[58] Field of Search ................................ 364/148–152, 364/157–165, 176, 177; 395/3, 61, 900

[56] References Cited

U.S. PATENT DOCUMENTS

| | | | |
|---|---|---|---|
| 4,864,490 | 9/1989 | Nomoto et al. | 364/162 |
| 4,882,526 | 11/1989 | Iino et al. | 364/162 |
| 4,903,192 | 2/1990 | Saito et al. | 395/900 |
| 5,043,862 | 8/1991 | Takahashi et al. | 395/900 |

FOREIGN PATENT DOCUMENTS 0078003  4/1991  Japan ..................... 395/3

Primary Examiner—Joseph Ruggiero
Assistant Examiner—Thomas E. Brown
Attorney, Agent, or Firm—Dickstein, Shapiro & Morin

[57] ABSTRACT

A fuzzy controller is disclosed which is furnished with an error generator to generate a first error between a present value and a desired value. A corrector unit calculates the amount of correction needed based on the error and adds the appropriate amount of correction to the desired value. An error generator generates a second error between the present value and the corrected desired value. A fuzzy inference unit performs fuzzy inferences, based on fuzzy rules and membership functions, on inputs which include the second error. The fuzzy controller thus performs fuzzy inferences based on an error existing between the present value and the corrected desired value after the corrected desired value is obtained from the error existing between a present value and a desired value. The fuzzy controller is able to perform feedback control in both transient and steady states of a control system.

9 Claims, 5 Drawing Sheets

FUZZY CONTROLLER APPARATUS AND METHOD FOR STEADY STATE CONTROL

FIELD OF THE INVENTION

This invention relates to a fuzzy controller used for the control of a feedback system.

BACKGROUND OF THE INVENTION

Conventional fuzzy controllers have drawbacks when the controlled object is in a steady state. FIG. 3 is a block diagram which shows a conventional fuzzy controller F arranged in a feedback system. In this diagram, 1 is an error generator, 2 is a differentiator circuit, 3 is a fuzzy inference unit, and 5 is the controlled object e.g. a machine or other device. The error generator 1 calculates the error e between the present feedback value Y, which is received from a sensor on the controlled object 5, and the target value r, which is supplied by a reference data generator 4. The differentiator circuit 2 calculates the differential $\Delta e$ of the error e. $\Delta e$ is the amount of variation of error e over time. Error e and its differential, $\Delta e$, are then provided as inputs for the fuzzy inference unit 3. A fuzzy inference is then performed on the inputs to determine the value of the actuating signal S. The actuating signal value S is then supplied to the controlled object 5.

FIG. 4 shows the control response waveform which is obtained during feedback control as described above. Over time, the present feedback value Y approaches a desired control value r.

FIG. 5 shows a set of membership functions based on the error e which originates in temperature control. Seven membership functions exist, corresponding to a range of error e, from $-100°$ C. to $+100°$ C.

In control dynamics, there are two states of variation: a transient state in which the error e is fluctuating and a steady state in which the error e remains stable. The above arrangement, however, gives rise to certain drawbacks, particularly when the controlled object is in a steady state of operation.

In particular, in the transient state, the amplitudes of the variations in the sequential values of error e are large, so that any fluctuation in the grade of the antecedent is readily apparent. Thus, memberships for the error e are easily determined by the fuzzy inference unit 3. In the steady state, however, the sequential values of the error e are relatively small (e.g. $0°$ C., $+1°$ C. and $-2°$ C.) and the amplitude of variation will thereby also be small. The fluctuations in the grade of the antecedent will virtually vanish, and the corresponding output values will hardly vary at all. In other words, only the steady-state error remains. Thus, normal fuzzy control becomes impossible to perform when the object remains in a steady state.

A potential solution to the problem is to employ variations of narrow amplitudes to define the membership functions. However, even though the amplitude of variation in the resulting value of error e would be small, noticeable fluctuations in the grade of the antecedent within those amplitudes would still occur. Such a solution would also expand the number of membership functions and the number of corresponding rules, so that appreciably more processing time would be required to set the values and perform the inferences.

SUMMARY OF THE INVENTION

In light of the above-noted deficiencies, this invention provides for a fuzzy inference controller which has as its primary object performing control properly in both the transient and steady states in a feedback control environment.

To achieve the above and other objects of the invention, a fuzzy controller has been designed which has an error generator for generating a first error between a present value and a desired value. A corrector unit is provided which calculates the amount of correction needed based on the generated first error and adds the appropriate amount of correction to the desired value. An error generator generates a second error between the present value and the corrected desired value. A fuzzy inference unit is also provided which performs fuzzy inferences, based on fuzzy rules and membership functions, on inputs which include the second error. The fuzzy controller thus performs fuzzy inferences based on an error value between the present value and the corrected desired value (Error 2) when the corrected desired value was previously obtained from the actual error (Error 1).

These and other objects, advantages and features of the invention will be more readily understood by reference to the following detailed description of the invention provided in association with the several attached drawings.

DETAILED DESCRIPTION OF THE PREFERRED EMBODIMENTS

Figure 1:
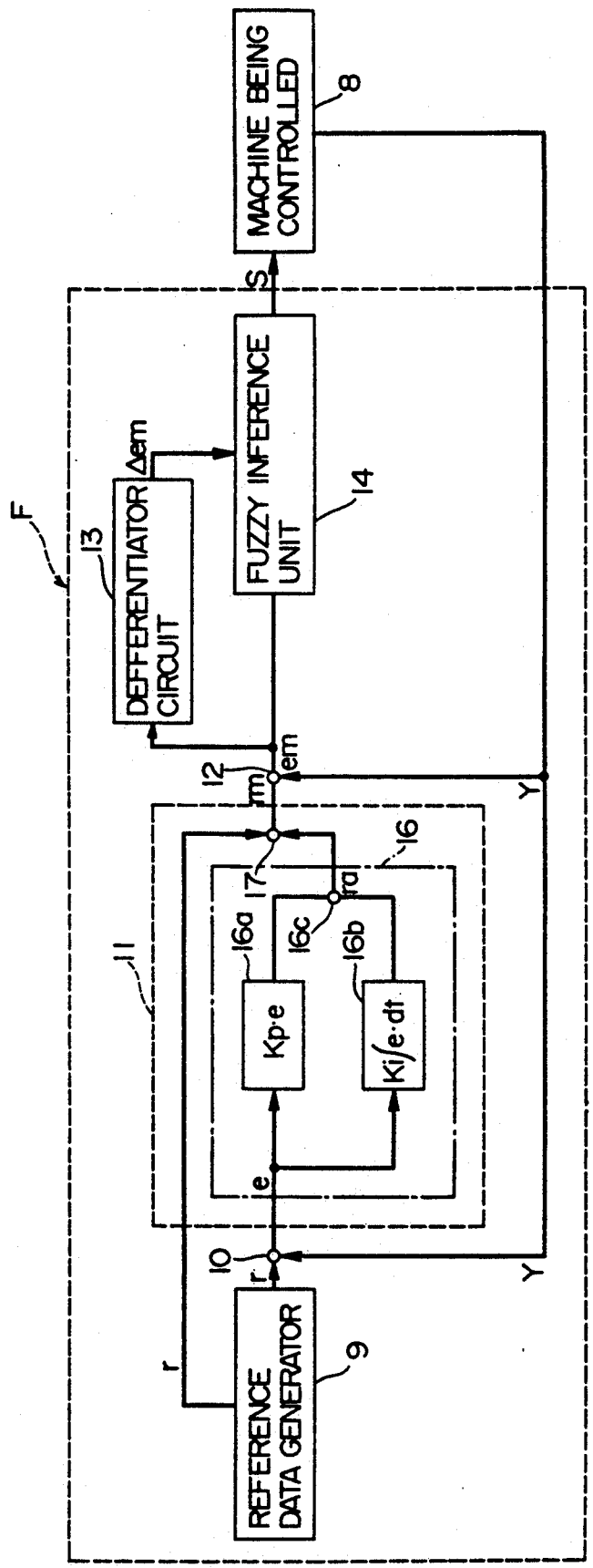
FIG. 1 is a block diagram of a fuzzy controller in a first embodiment of the present invention.

Referring now in detail to the drawings wherein like parts are designated by like reference numerals throughout, there is illustrated in FIG. 1 a function block diagram showing the entire structure of the fuzzy controller F in a first embodiment of the present invention.

In this diagram, an error generator 10 is shown as receiving outputs from a reference data generator 9 and the present feedback value Y from the controlled object 8. The error generator 10 generates a primary error signal e. The primary error signal e represents the error between the present feedback value Y and a desired value r.

A correction device 11 is provided which functions to correct the desired value r. In operation, the corrector 11 calculates the corrected desired value rm based on the desired value r received from the reference data generator 9 and the primary error e. The corrector 11 then generates a secondary error value $e_m$ which is determined by the error generator 12 from the corrected desired value $r_m$, provided from the correction device 11, and the present feedback value Y. The secondary error $e_m$ will be used as an input for inference determination.

A differentiator circuit 13 functions to calculate a differential $\Delta e_m$ with respect to time from the secondary time error value $e_m$ received from the error generator 12. The differential error $\Delta e_m$ and secondary error value em are then used for inference calculations. The fuzzy inference unit 14 then performs a fuzzy inference based on the fuzzy rules and membership functions to yield an actuating signal S.

Figure 3:
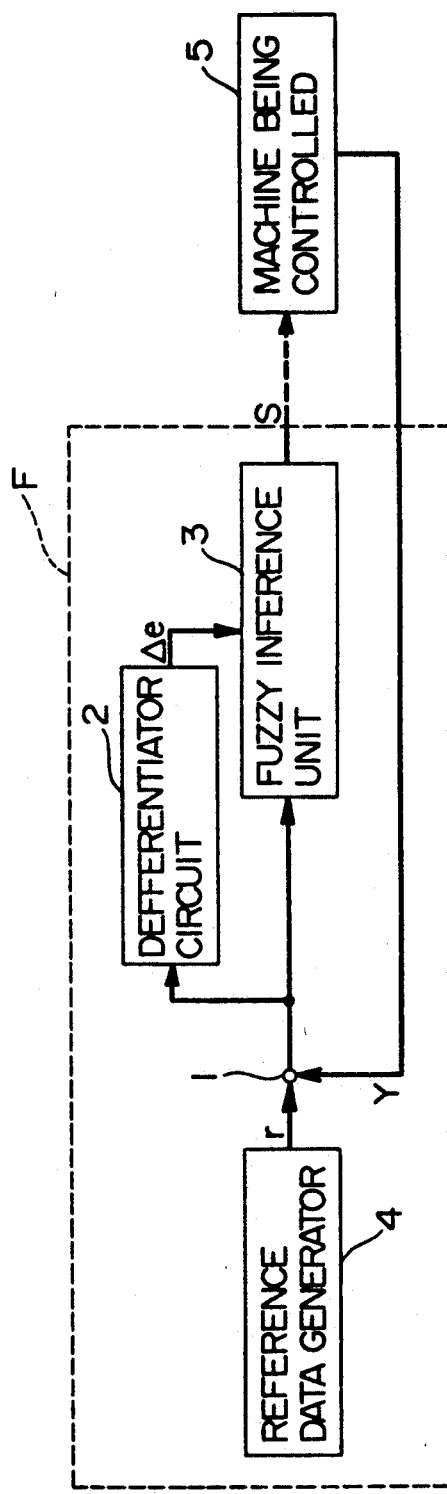
FIG. 3 is a function block diagram of a conventional fuzzy controller.
Figure 4:
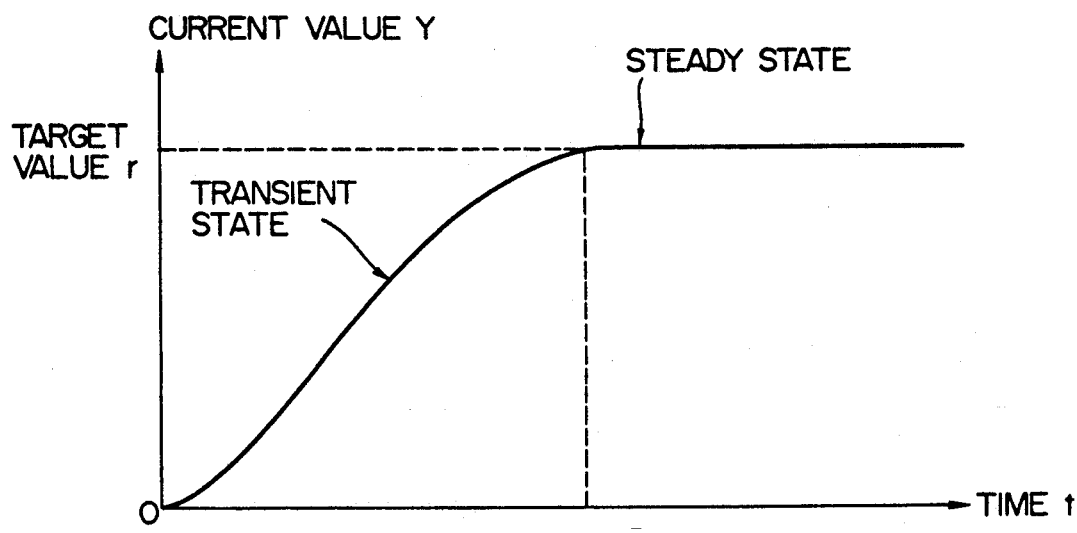
FIG. 4 is a graph illustrating a general control waveform which occurs in feedback control.
Figure 5:
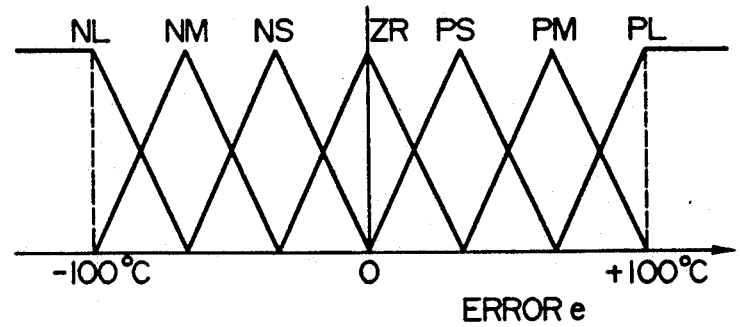
FIG. 5 illustrates fuzzy membership functions for feedback error.

In the embodiment described above, the secondary error generator 12, the differentiator circuit 13 and the fuzzy inference unit 14 correspond generally to the error generator 1, the differentiator circuit 2 and the fuzzy inference unit 3, respectively shown in FIG. 3. However, by providing the primary error generator 10 and the correction device 11, the controller of the above-noted embodiment is capable of setting a corrected desired value $r_m$ which is then fed to the secondary error generator 12. The error generator 12 thus uses the corrected target value $r_m$ and the present feedback value Y to determine a secondary error $e_m$ (to be used for the inference) and its differential $\Delta e_m$ and to then perform a fuzzy inference.

The correction device 11 is composed of calculation unit 16 connected to a summing unit 17. The calculation unit 16 calculates the amount of correction $r_a$ for the desired value based on the primary error e, which was obtained from the primary error generator 10. The calculation unit 16 is comprised of an accumulator 16a, an integrator 16b and a summing unit 16c. The summing unit 17 adds the amount of correction $r_a$ to the desired value r.

The aforementioned amount of correction $r_a$ for the desired value is computed according to the following formula:

$$R_a = K_p \cdot e + K_1 \int \quad (1)$$

(where $K_p$ and $K_1$ are constants)

Accordingly, the amount of correction $r_m$ for the desired value will be as follows:

$$r_m = r + K_p \cdot e + K_i \int \quad (2)$$

Because e is equal to r minus y, then:

$$r_m = r + K_p \cdot (r - y) + K_i \int \quad (3)$$

In the above formula, whenever an error $(r-y)$ remains, the value of $K_1 \int (r-y) \, dt$ will increase with time and thus $r_m$ will also increase.

The corrected desired value $r_m$, which is thereby larger than the actual desired value r, is then used to determine a second error value $e_m$. The second error $e_m$, which is to be used for fuzzy inference, is then generated by the secondary error generator 12. Error $e_m$ is also larger than the original error value e.

The use of these two larger values ($e_m$, $\Delta e_m$) for the fuzzy inference thus enables the controller to output a larger value for the actuating signal S. A larger value for S will result in a closer approximation between the present feedback value Y and the desired value r, even when the controlled object 8 is in a steady state. As a result, a small steady-state error value is generated in the control operation.

Figure 6A:
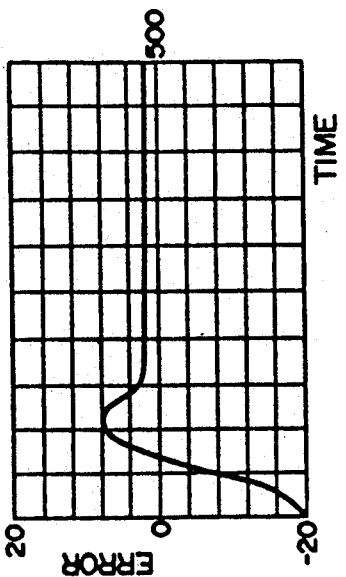
FIGS. 6A-6C illustrate graphs of control waveforms for different target values.
Figure 6B:
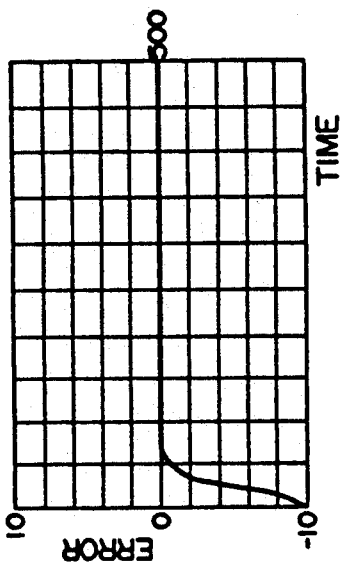
Figure 6C:
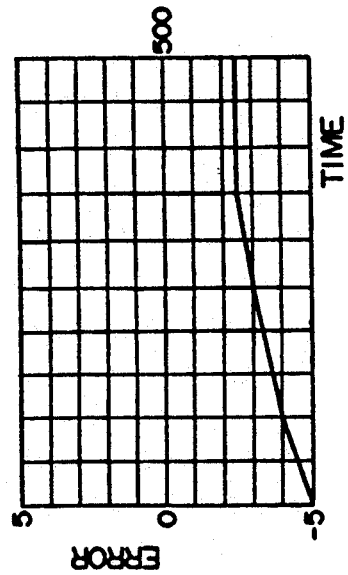

Referring to the graphs in FIGS. 6A–6C, the response waveforms, which occur in fuzzy control with small, medium and large desired values, are shown. If the desired value r is small, the response waveform will have a slow rise time, as shown in FIG. 6A. If the desired value is large, the response waveform will show an oscillation, as shown in FIG. 6C. With the controller of this invention, as explained above, the desired value is corrected so that it is normally in the mid-range. This allows a proper response waveform to be achieved, as shown in FIG. 6B.

Figure 7A:
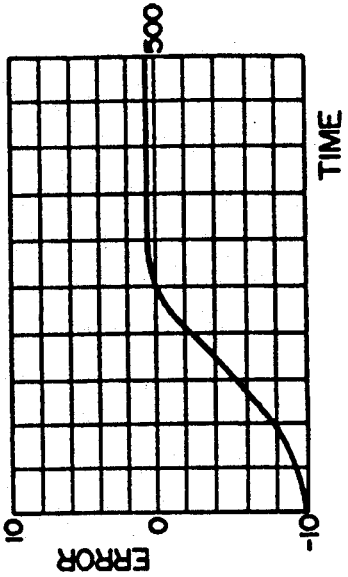
FIGS. 7A-7C illustrate graphs of control waveforms for different values of inertia.
Figure 7B:
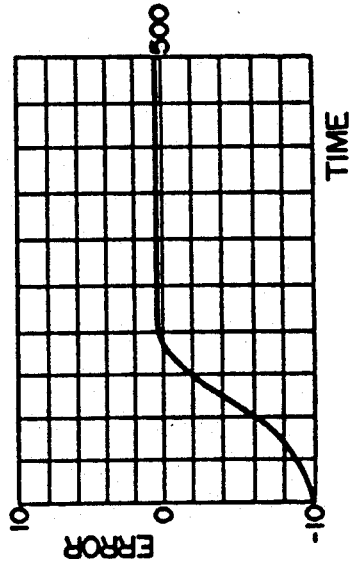
Figure 7C:
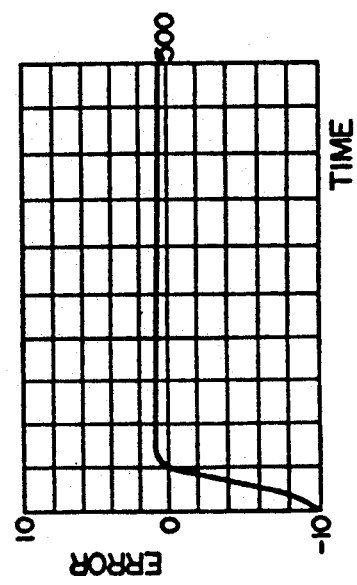

The graphs in FIGS. 7A–7C show the response waveforms which occur in fuzzy control with a fixed desired value and small, medium and large inertias. As can be seen in the graphs, the greater the inertia, the slower the response. With a slow response time, the desired value can be corrected so that it is larger, thereby increasing the response speed.

Figure 2:
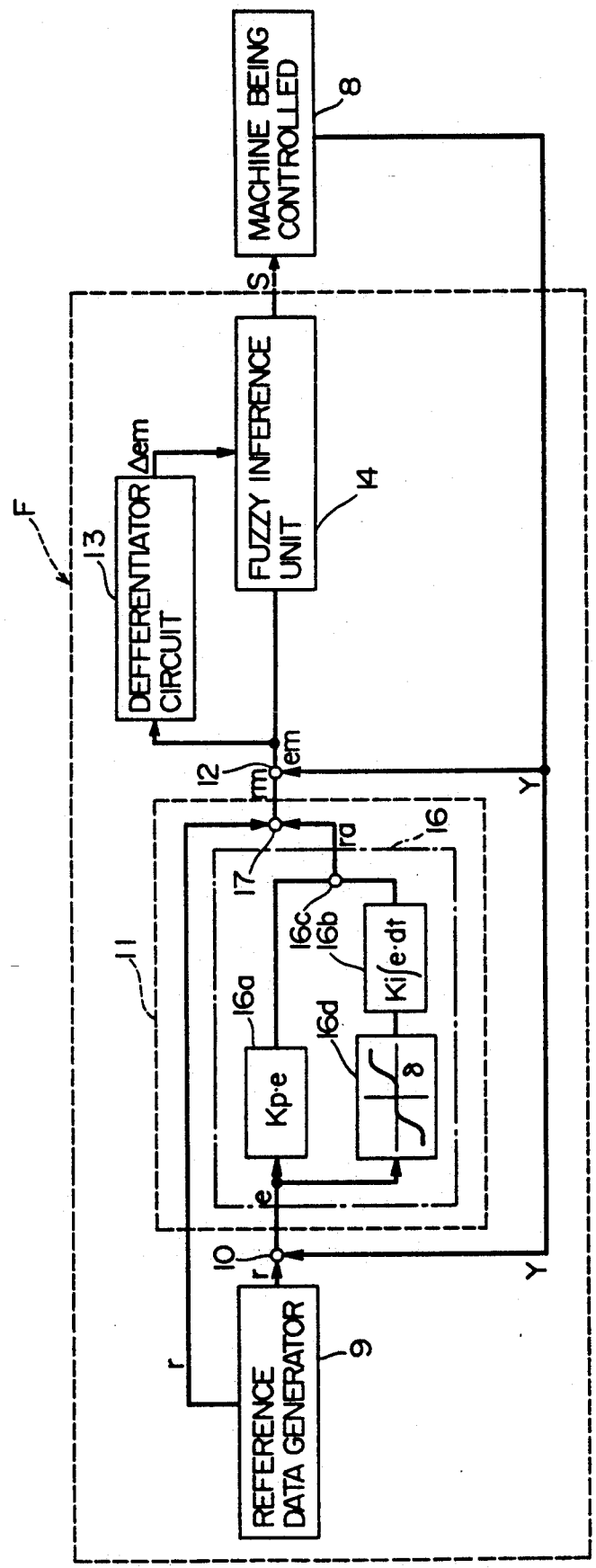
FIG. 2 is a block diagram of a fuzzy controller in a second embodiment of the invention.

In the first embodiment described above, the integrated portion may increase excessively when the corrected desired value $r_m$ is calculated. To avoid such occurrence, a second embodiment is provided, as shown in FIG. 2. The second embodiment resembles the embodiment of FIG. 1 except that an integral dead zone 16d is provided in calculation unit 16. This dead zone 16d, which is in the first part of the integrator 16b, suppresses oscillation in the vicinity of the steady state point.

The corrected target value $r_m$ can also be calculated by using a fuzzy inference unit to provide an error e and an error integral $\int e \, dt$ as the two inputs for the calculation unit 16 (not shown). Fuzzy inference thus can also be used to achieve the corrected target value $r_m$.

With this invention, as demonstrated in its two embodiments, a fuzzy inference is performed based on the secondary error between the current feedback value Y and the corrected desired error value $e_m$. The correction of desired value $e_m$, which is appropriate for control operation, is obtained by modifying the primary error e. The use of this apparatus and method allows the actuating signal S to be large enough so that the present feedback value Y closely approximates the desired value $r_m$, even in a steady state. The present arrangement also allows the steady state error, which occurs in typical control dynamics, to be eliminated. As a result, proper control can be accomplished in both transient states and in a steady state.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A fuzzy controller comprising:
    a first error generator which generates a first error value based on a difference between a present feedback value and a desired value;
    a first storage device for storing said first error value;
    a desired value corrector for producing a corrected desired value by determining an amount of correction needed based on said first error and adding an appropriate amount of correction to said desired value;
    a second error generator for generating a second error value based on a difference between said present feedback value and said corrected desired value;

a second storage device for storing said second error value;

a fuzzy inference unit for computing fuzzy inference based on fuzzy rules and membership function, in accordance with said second error value and for producing a control signal based on a result of said fuzzy inferences; and a controlled object for receiving said control signal in order that operations of said controlled object can be affected by said received control signal.

2. The apparatus of claim 1, wherein said second error generator further comprises a differentiator device that differentiates said second error value over time.

3. The apparatus of claim 2, wherein said fuzzy inference unit calculates fuzzy inferences based on said second error value and said differentiated second error value.

4. The apparatus of claim 1, wherein said desired value corrector further comprises:

an accumulator that multiplies said first error value by a constant;

an integrator that integrates said first error value and multiplies aid integral by a constant; and a first summer which sums outputs from said integrator and said accumulator to produce a first corrected value.

5. The apparatus of claim 4, wherein said corrector further comprises a second summer that adds said first corrected value and said desired value to produce said corrected desired value.

6. The apparatus of claim 1, further comprising a dead zone correction device that suppresses oscillation of said first error value in the vicinity of a steady state point.

7. The apparatus of claim 1 wherein said second error value is larger than said first error value when said controlled object is in a steady state, and said second error value causes said fuzzy inference device to produce an actuation value as said control signal for said controlled object.

8. A method of fuzzy control, comprising the steps of:

generating a first error signal representing a difference between a present feedback value and a desired value;

correcting said desired value by calculating a correction value based on said first error signal and adding said corrected value to said desired value;

generating a second error signal representing a difference between said present feedback value and said corrected desired value;

performing fuzzy inferences based on fuzzy rules and membership functions relating to said second error value;

producing a control signal based on a result of said fuzzy inferences; and receiving said control signal in order that operations of a controlled object can be affected by said received signal.

9. The apparatus of claim 1, further comprising a third storage device which stores said fuzzy rules and membership functions.

* * * * *